M. LOVE.
MECHANISM FOR CRACKING NUTS.
APPLICATION FILED NOV. 27, 1911.
1,073,694.
Patented Sept. 23, 1913.
5 SHEETS—SHEET 3.
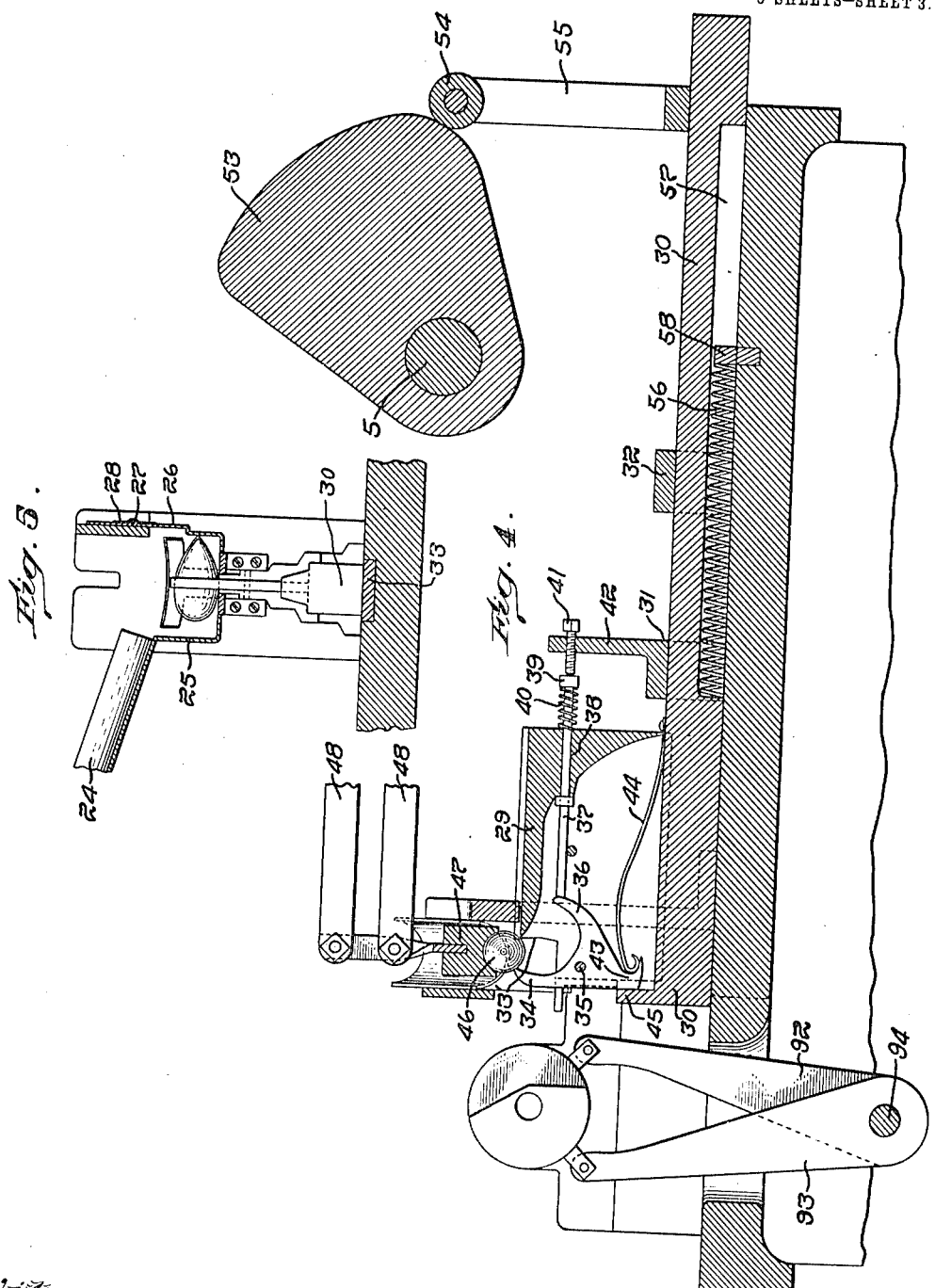
Witnesses:
Carl L. Choate.
Horace A. Crossman
Inventor:
Matthew Love.
By Emery, Booth, Janney & Varney,
Attys.

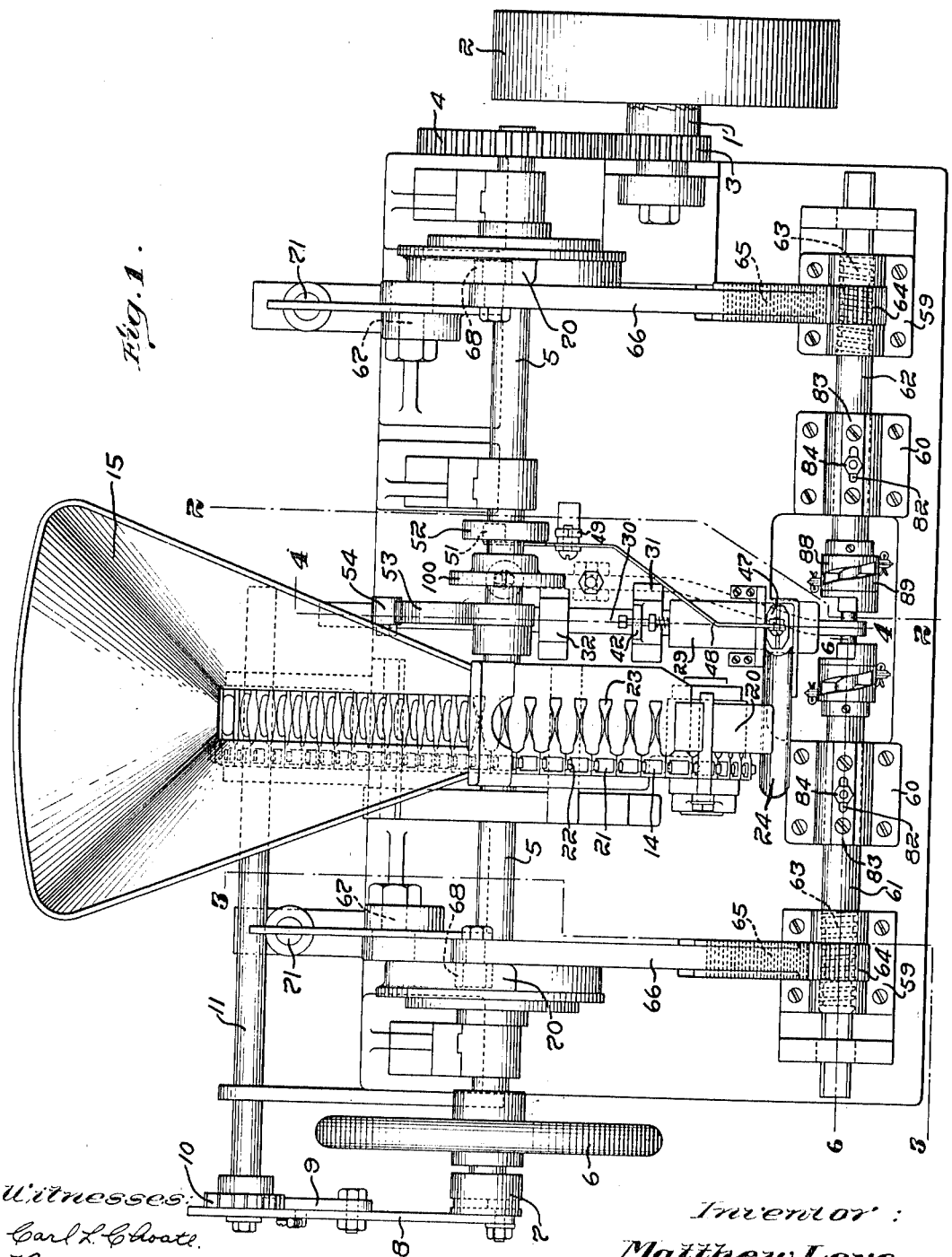
M. LOVE.
MECHANISM FOR CRACKING NUTS.
APPLICATION FILED NOV. 27, 1911.
1,073,694. Patented Sept. 23, 1913.
5 SHEETS—SHEET 1.

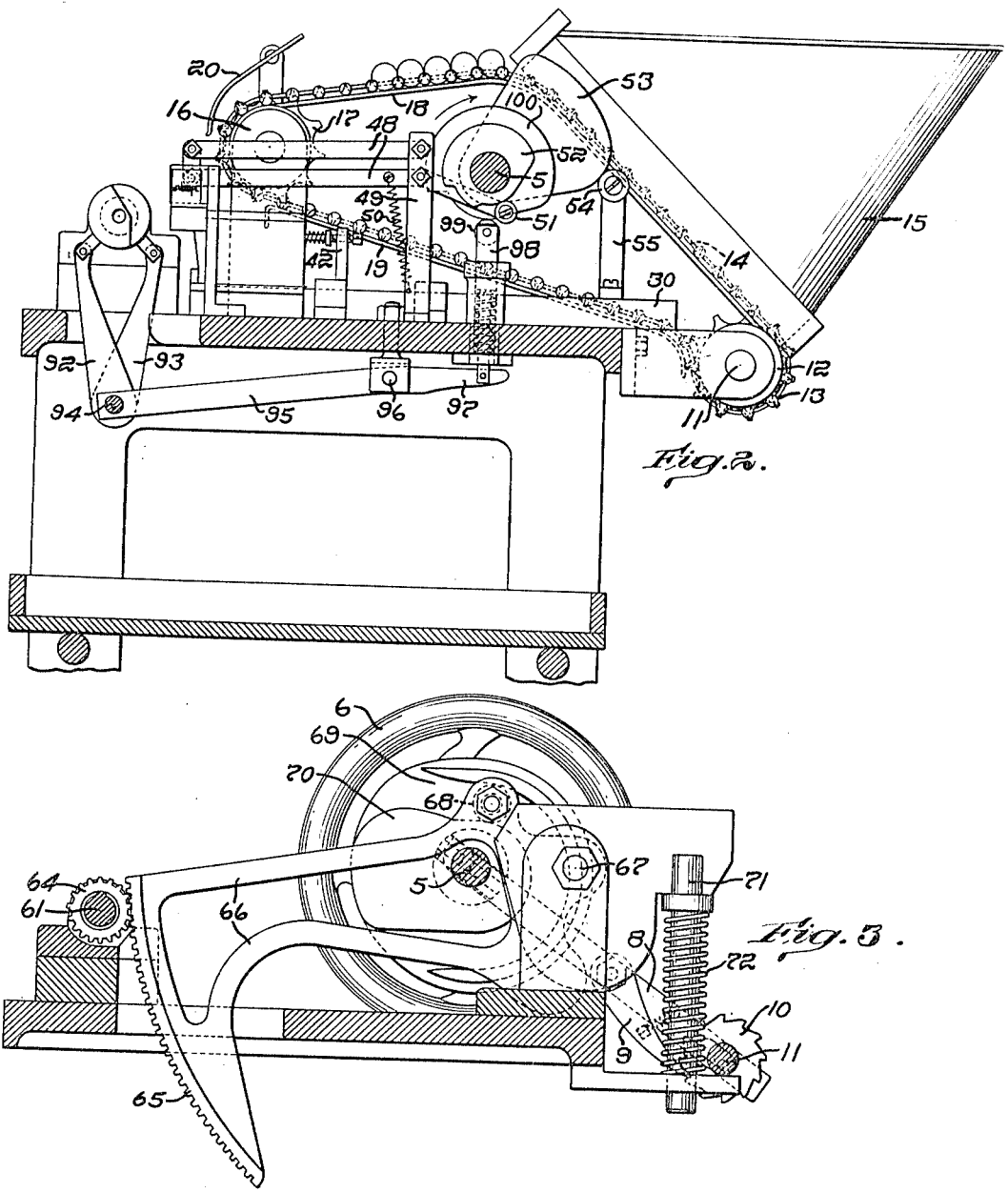

M. LOVE.
MECHANISM FOR CRACKING NUTS.
APPLICATION FILED NOV. 27, 1911.
1,073,694.
Patented Sept. 23, 1913.
5 SHEETS—SHEET 4.
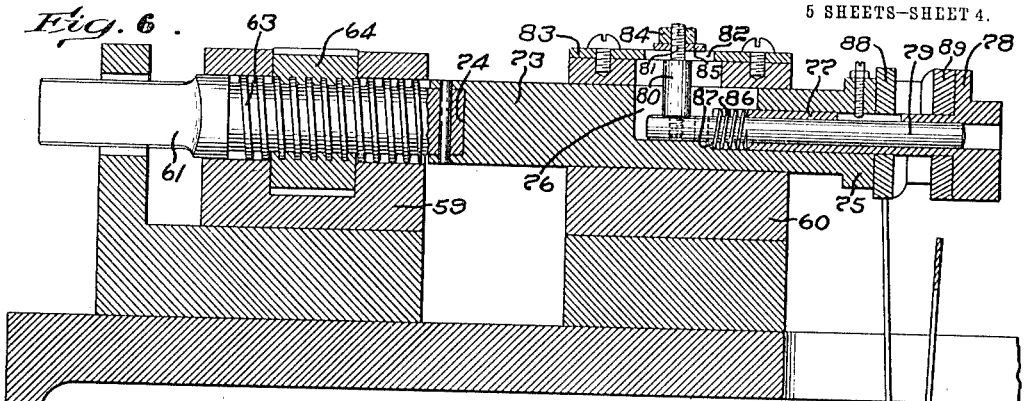
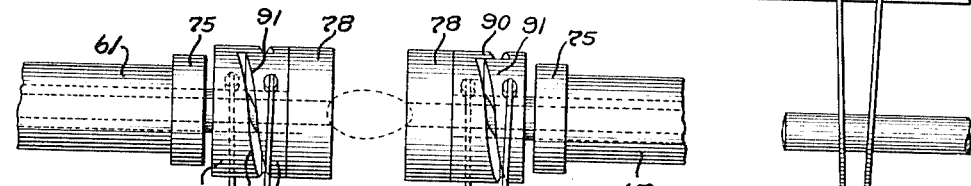
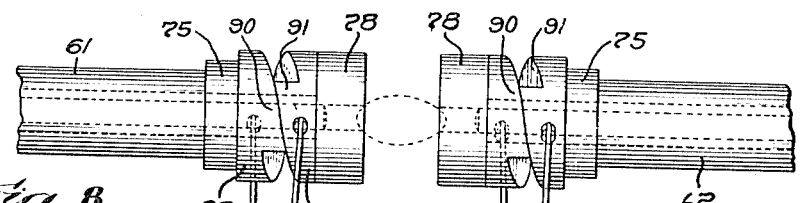
Witnesses:
Carl L. Choate.
Horace A. Crossman.
Inventor:
Matthew Love,
by Emery, Booth, Janney & Varney,
Attys.

M. LOVE.
MECHANISM FOR CRACKING NUTS.
APPLICATION FILED NOV. 27, 1911.

1,073,694.

Patented Sept. 23, 1913.
5 SHEETS—SHEET 5.

Witnesses:
Horace A. Crossman
Carl L. Choate.

Inventor:
Matthew Love.
by Emery, Booth, Janney, & Varney,
Attys

UNITED STATES PATENT OFFICE.

MATTHEW LOVE, OF WORCESTER, MASSACHUSETTS, ASSIGNOR TO HARRY W. KNIGHTS, OF BOSTON, MASSACHUSETTS.

MECHANISM FOR CRACKING NUTS.

1,073,694. Specification of Letters Patent. Patented Sept. 23, 1913.

Application filed November 27, 1911. Serial No. 662,550.

*To all whom it may concern:*

Be it known that I, MATTHEW LOVE, a citizen of the United States, and a resident of Worcester, county of Worcester, Commonwealth of Massachusetts, (whose post-office address is 100 Beacon street, Worcester,) have invented an Improvement in Mechanism for Cracking Nuts, of which the following description, in connection with the accompanying drawings, is a specification, like characters on the drawings representing like parts.

This invention relates to nut crackers and as regards certain features thereof is an improvement upon the patent granted to Henry R. Gilson, No. 928,958, July 27, 1909.

In order that the principle of the invention may readily be understood, I have disclosed one embodiment thereof in the accompanying drawings wherein—

Figure 9:
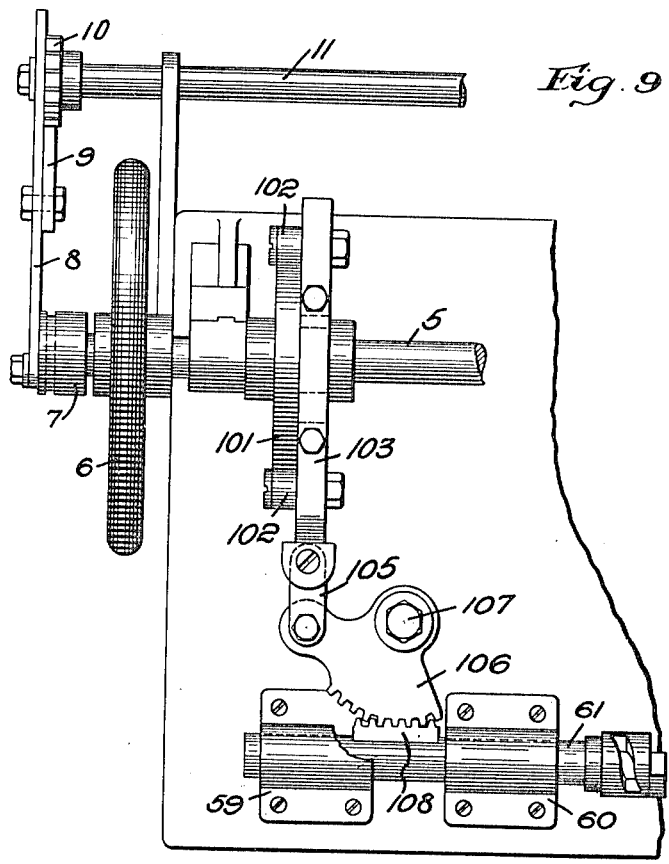
Figure 10:
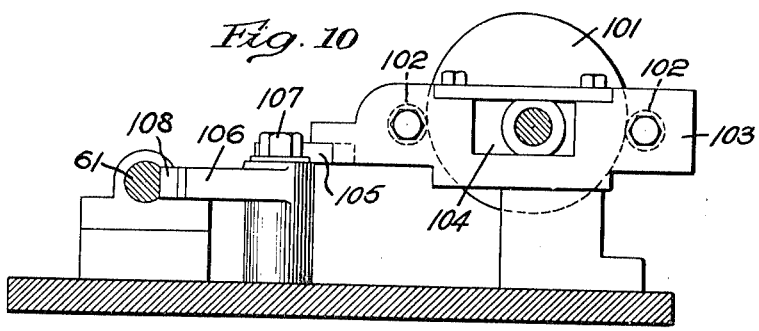

Figure 1 is a plan view of a nut cracking mechanism embodying my invention; Fig. 2 is a view partially in end elevation and partially in vertical transverse section on the line 2—2 in Fig. 1, of said mechanism, looking toward the left in said figure; Fig. 3 is a view partially in side elevation and partially in vertical transverse section upon the line 3—3 of Fig. 1, looking toward the left in said figure; Fig. 4 is a similar view upon the line 4—4 of Fig. 1 the hopper being omitted; Fig. 5 is a view partially in front elevation and partially in vertical transverse section of the parts shown in Fig. 4; Fig. 6 is an enlarged longitudinal section upon the line 6—6 in Fig. 1; and Figs. 7 and 8 are details representing in side elevation different positions of the nut cracking jaws or elements and operating parts therefor. Fig. 9 is a plan view of a portion of nut cracking mechanism embodying my invention and showing a slightly modified form of means for operating the nut cracking shafts; and Fig. 10 is a view partly in side elevation and partly in vertical section of the construction shown in Fig. 9.

The satisfactory cracking of nuts has heretofore been attended with great uncertainty and difficulty because of the varying sizes of the nuts. I have devised mechanism which is equally effective upon nuts of different lengths and which removes the shell therefrom completely without injury to the kernel.

Referring more particularly to the drawings wherein is disclosed one embodiment of the invention, the framing of the mechanism is indicated at 1 in the several figures. Thereon I have mounted in suitable bearings the power shaft 1' having thereon a pulley 2 and pinion 3 meshing with a gear 4 upon the main shaft 5 mounted in suitable bearings upon the framing of the machine. Upon shaft 5 are mounted rotating elements by which power is applied to the various nut feeding and nut cracking instrumentalities. I shall first refer to the nut feeding mechanism, it being understood that any suitable feeding mechanism may be employed, that illustrated being found suitable with certain types or kinds of nuts.

Upon the main shaft 5 and preferably near one end thereof I mount a hand-wheel 6 and eccentric 7 by which to and fro movement is imparted to arm 8 having thereon pawl 9 engaging the ratchet 10 fast upon the countershaft 11 mounted in suitable brackets upon the main framing, whereby a step by step movement of rotation is imparted to said countershaft. Fast upon the countershaft 11 near the opposite end thereof, as most clearly shown in Fig. 2, is a drum or roll 12 having fast therewith or formed thereon a sprocket gear 13 about which passes a sprocket chain 14 traveling along the slotted bottom of a suitable hopper 15 wherein the nuts are placed in any suitable manner and from which they are withdrawn singly by said sprocket chain and conveyed to the nut cracking mechanism proper. In order suitably to support and guide the conveyer or sprocket chain I preferably provide a second drum 16 mounted in suitable standards of the framing and having fast therewith or formed thereon a sprocket gear 17 about which the sprocket chain 14 passes. Between the drum 16 and the hopper 15 I provide a suitable supporting plate or guide 18 whereon the upper run of the sprocket chain may rest, and between the drums 12 and 16 I preferably provide a similar plate 19 to receive the lower run of said sprocket chain. Obviously, however, any suitable guiding means may be employed. Preferably overlying the delivery end of the sprocket chain I provide a suitable nut guiding plate 20 to direct the nuts to the cracking instrumentalities.

The sprocket chain conveyer is preferably of the construction indicated most clearly in Fig. 1 wherein I have shown links 21 suitably jointed together by clips 22. Each of said links has integrally formed therein and laterally extending therefrom an arm or support 23 preferably shaped as indicated in said figure. The adjacent arms receive therebetween a single nut as indicated in Fig. 2 and convey the same step by step toward the nut cracking instrumentalities.

As indicated most clearly in Figs. 1, 2, 4 and 5, the nuts are delivered from the conveyer onto a transversely arranged inclined chute 24 by which they are received endwise and down which they slide into a pocket 25 forming the terminal of said chute and with which co-acts the positioning mechanism. The side wall of said pocket 25 opposite the inclined portion 24 of the chute is provided with a yielding member, so that if two nuts are conveyed together into said pocket, one of them may be discharged therefrom thus preventing injury to the mechanism. For that purpose I have here shown a gate 26 hinged as represented at 27 and normally held close by a coiled or other spring 28.

Beneath the pocket 25 of the chute 24 I provide nut positioning mechanism of suitable construction and herein represented as composed of a head block, or table 29, formed with or fast upon a reciprocating bar 30 mounted in suitable guideways 31—32 upon the framing or bed plate of the machine and herein represented as slidable upon a brass or other bearing 33 shown most clearly in Fig. 5. The forward end of the table or block 29 is provided with a socket or shouldered portion 33′ forming a stationary jaw and with which co-acts a movable jaw 34 constituting one arm of a lever hinged at 35 upon said table. Another arm 36 of said lever is impinged upon by a rod or pin 37 mounted to slide in a socket 38 in said block. The head 39 upon the outer end of said rod or pin is held by coiled spring 40 against an adjusting screw 41 mounted in a standard 42 shown as upstanding from the guide 31. With a third arm 43 of said lever engages a leaf or other spring 44 by which said arm is yieldingly held against a shoulder 45 upstanding from the forward end of the bearing 30.

Reciprocating motion is imparted to the block or table 29 in any suitable manner. Upon inward movement of said block or table, that is, upon movement toward the right viewing Fig. 4, the said table slides along the stationary pin or rod 37 and consequently swings the three arm lever about the pivot 35 so as to move the arm 34 constituting the movable jaw outwardly with reference to the fixed jaw 33′ thereby permitting the nut 46 to drop or to be forced into position between said jaws where it is firmly held.

If desired, I may let the nuts drop by gravity between the jaws 33′, 34, but preferably I provide positioning plunger means of suitable type, such for example, as that represented in Figs. 2, 4 and 5 wherein the plunger head is indicated at 47 as having a concaved lower face to engage the nut. This head is carried by the outer ends of preferably parallel arms 48 pivoted as shown in Fig. 2 upon a standard 49 rising from the bed plate of the machine. To the lower arm 48 is connected a spring 50, the other end whereof is connected to the framing of the machine whereby the plunger is normally drawn downward. The lower arm 48 is prolonged in the opposite direction beyond the standard 49 and is provided with a roll 51 adapted at all times to contact with a cam 52 fast upon the main shaft 5. The rotation of said cam serves intermittently to elevate the plunger 47 and to permit successive nuts to be positioned therebeneath, the spring 50 returning the plunger after each lifting movement thereof.

Any suitable means may be employed to reciprocate the table or block 29. Herein for the purpose I have provided a cam 53 upon the main shaft 5, as shown most clearly in Fig. 4 with which engages a roll 54 upon a bracket or standard 55 rising from the slide bar 30. The roll 54 is held in contact with the cam 53 by means of a coiled spring 56 positioned in a recessed portion 57 of the slide 30 and engaging at its rear end a pin or abutment 58 against which it is compressed when the slide 30 is moved toward the right viewing Fig. 4.

The nut, firmly held between the fixed and movable jaws of the block 29, is carried forward into position between the nut cracking jaws or elements which are so constructed as to act with equal efficiency upon nuts of different sizes. Preferably the nut cracking jaws are yieldingly constructed to permit the separation of the jaws to any desired extent for the reception of nuts of different sizes and to effect the firm grasping thereof. I also provide means coöperating with the jaws to cause them to bind firmly and unyieldingly upon the nut when once it has been grasped therebetween. In conjunction with these devices I provide means for imparting nut cracking movement to one or both of the jaws.

Referring more particularly to Figs. 1, 2, 3 and 6 to 8, I mount in suitable bearings 59—60 two shafts 61—62 each of which is threaded as indicated at 63 within its bearings 59, 60. As the construction of the two shafts and the operating means therefor are preferably substantially identical, I have particularly shown and shall particularly describe the shaft 61. The shaft 61 is mounted for reciprocating movement within its bearings and receives upon the threaded portion thereof a pinion 64 internally threaded to engage the threaded portion 63 of said shaft. Inasmuch as said pinion 63 is held from lateral movement by the bearing 59, rotation of said pinion in either direction imparts axial movement to said shaft 61. Any suitable means may be provided to rotate said pinion, but herein for the purpose I provide a grooved rack 65 formed upon a lever 66 pivoted at 67 upon a bracket rising from the framing of the machine and provided with a roll 68 adapted to engage the track 69 of a cam 70 mounted upon the main shaft 5 adjacent the hand wheel 6. The lever 66 is prolonged rearwardly beyond its pivot 67 and is there provided with a plunger 71 surrounding which is a coiled spring 72, said plunger and spring co-acting with the lever to assist in imparting downward movement to the free end thereof. As shown in Fig. 1, the shafts 5 and 62 are provided with similar means to reciprocate the latter. The shaft 61 may, if desired, be integral throughout, but in Fig. 6 I have indicated the forward portion 73 thereof as pinned at 74 to the threaded end thereof, for convenience of construction.

The forward portion 73 of each of the shafts 61—62 terminates in a head 75 and is longitudinally recessed as indicated at 76 for the reception of a sleeve 77, the outer end whereof is provided with a head 78 constituting the nut cracking jaw. Within the sleeve 77 is positioned a nut ejector 79 stationarily held at all times and longitudinally of which the shaft portions 61, 73 are moved by the described rotation of the pinion 64. Attached to the rear end of the ejector 79 is a roll or pin 80 upon a threaded spindle 81 projecting forwardly through a longitudinal slot 82 in the cap or cover 83 of the bearing 60. Upon the threaded portion of the spindle 81 is a nut 84 and washer 85 adapted to bind against the outer face of the cap 83 and to hold the ejector in its adjusted position. It is apparent from the foregoing description that each ejector may be axially adjusted to meet the varying requirements, as may be desired. Surrounding the end of each ejector 79 is a coiled spring 86 positioned between a shoulder 87 upon the shaft 73 and the rear end of the sleeve 77 and serving to cushion the movement of said sleeve.

Between the head 75 of each shaft member 73 and the jaw 78 of the sleeve 77 I position devices which in one position thereof permit the yielding of the jaws to grasp nuts of various sizes and in another position thereof hold the jaws rigidly or unyieldingly against the nut. For this purpose I have herein provided two cam or wedge members 88, 89, loose upon the sleeve 77 and provided with inclined engaging faces 90, 91 adapted to ride upon each other.

Rotation of the cam members 88, 89 relatively to each other causes the cam member 88 to move axially along the sleeve 77 and thus to contact unyieldingly with the head 75 of the shaft member 73, the cam member 89 contacting with the inner face of the jaw 78, as illustrated in Fig. 8. Reverse rotation of said cam members causes the member 88 to return to its non-projected position as shown in Fig. 7.

Any suitable means may be provided to cause relative rotation of the two pairs of cam members 88, 89, but herein for the purpose I have provided two pairs of links 92, 93, each pivoted upon a rod 94 beneath the bed plate of the machine and upon the outer end of a lever 95 pivoted at 96 and having its opposite end 97 provided with a spring pressed plunger 98 the upper end whereof has a roll 99 engaging a cam 100 upon the shaft 5. The cam 100 acts through the described connections upon both pairs of cam members and in its rotation in the direction of the arrow, Fig. 2, periodically causes the depression of the rod 94 and consequently the relative rotation of the cam members 88, 89 in one direction to bring them into the position shown in Fig. 8. The spring induced movement of the lever 95 in the opposite direction returns said cam members to the position shown in Fig. 7. It will thus be evident that in one position of the cam members 88, 89, the nut cracking jaws 78 are capable of yielding relatively to each other to permit the insertion or reception therebetween of a nut whatever be its size, it being evident that the range of yielding movement of said cracking jaws 78 may be of any suitable extent. After the nut has been inserted or received between the yielding jaws, the latter are caused rigidly to hold the nut, and preferably by the mechanism herein described, after which the shafts 61, 62 are projected toward each other to crack the nut. Thereupon the pinions 64 are rotated in the opposite direction to retract said shafts 61, 62, thus causing the relative projection of the ejectors 79, 79, which discharge the cracked nut as will readily be understood.

It will be understood from the foregoing description that nuts of all sizes, within the capacity of the mechanism, may be accurately cracked. The mechanism obviously may be constructed to act upon nuts of all sizes. The parts are so timed that upon the cracking of a nut and its ejection from the cracking jaws, the succeeding nut, held between the positioning jaws 33', 34, is inserted between the cracking jaws 78, 78, which at such time may yield as described, to permit the reception of the nut.

In Figs. 9 and 10, I have shown a slightly modified form of mechanism for operating the shafts 61, 62 carrying the nut cracking jaws. Therein the main shaft 5 is provided with a cam 101 fast thereon and peripherally engaging rollers 102 projecting laterally from a suitably supported slide 103 slotted at 104, so as to reciprocate transversely of the main shaft under the action of said cam. Pivoted to the inner end of said slide 103 is a link 105 which at its opposite end is pivoted to a toothed segment 106 itself pivoted at 107 upon the framing of the machine. The teeth of said segment mesh into a rack 108 formed with or fast upon the shaft 61, whereby the rotation of the main shaft 5 imparts longitudinal, axial reciprocations to the said shaft 61 at the desired times. Preferably the same or similar mechanism may be employed to reciprocate the shaft 62. Any other suitable means may be employed to reciprocate said shafts 61, 62.

Having thus described one illustrative embodiment of my invention, I desire it to be understood that although specific terms are employed, they are used in a generic and descriptive sense and not for purposes of limitation, the scope of the invention being set forth in the following claims.

Claims.

1. Nut cracking mechanism comprising in combination a pair of shaft-like devices each having loosely mounted thereon a nut cracking jaw or element and also having a rigid abutment, a member positioned between each jaw or element and the corresponding abutment, means coöperating with each of said members and the corresponding abutments, to cause said jaws or elements unyieldingly to grasp the nut, and means acting upon said shafts to cause said jaws or elements to crack the nut while the latter is grasped unyieldingly by said jaws or elements.

2. Nut cracking mechanism comprising in combination a pair of nut cracking jaws or elements, means yieldingly to support said jaws or elements for the reception of the nut, means mounted concentrically with and rotatable about the axis of said jaws or elements to cause the latter unyieldingly to grasp the nut, and means to crack the nut while grasped unyieldingly.

3. Nut cracking mechanism comprising in combination nut cracking jaws or elements, means yieldingly to support one at least of said jaws or elements for the reception of the nut, means mounted concentrically with said jaws or elements, and rotatable about the axis of said jaws or elements to cause the latter unyieldingly to grasp the nut, and means to crack the nut while grasped unyieldingly.

4. Nut cracking mechanism comprising in combination, a pair of nut cracking jaws or elements, yielding supports therefor, supporting means for said jaws or elements and said yielding supports, and cam devices positioned between said latter supports and said jaws or elements to cause the latter to grip the nut unyieldingly prior to the nut cracking operation.

5. Nut cracking mechanism comprising in combination nut cracking jaws having supporting sleeves, longitudinally movable supports for said jaws and said sleeves, and cam operating devices between said jaws and said sleeves adapted to move said jaws or elements to grasp the nut unyieldingly prior to the nut cracking operation.

6. Nut cracking mechanism comprising in combination, a pair of nut cracking jaws or elements, yielding supports therefor, shafts carrying said jaws and having abutments, and means between said abutments and said jaws adapted to move the latter to grasp the nut unyieldingly prior to the nut cracking operation.

7. Nut cracking mechanism comprising in combination, a pair of nut cracking jaws or elements, a spring support for one at least of said jaws, shafts for said jaws, one at least of said shafts having an abutment, and means between said abutment and the adjacent jaw adapted to move the jaw to grasp the nut unyieldingly for the nut cracking operation.

8. Nut cracking mechanism comprising in combination, nut cracking jaws or elements, yielding supports therefor, shafts carrying said jaws or elements and having abutments, and a rotatable wedge between each jaw and the adjacent abutment adapted to move said jaws to grasp the nut unyieldingly for the nut cracking operation.

9. Nut cracking mechanism comprising in combination nut cracking jaws or elements, yielding supports therefor, shafts carrying said jaws and having abutments and pairs of relatively movable wedges between each jaw and the adjacent abutment to cause said jaws to grasp the nut unyieldingly.

10. Nut cracking mechanism comprising in combination a pair of nut cracking jaws or elements, yielding supports therefor, shafts carrying said jaws and their yielding supports and having abutments and pairs of cams between each jaw and the adjacent abutment to cause the jaws to grasp the nut unyieldingly.

11. Nut cracking mechanism comprising in combination nut cracking jaws or elements, spring supports therefor, shafts carrying said jaws and their spring supports and having abutments, pairs of cams between said jaws and their abutments, and means to impart opposite movement of rotation to said cams.

12. Nut cracking mechanism including a nut cracking jaw, a yieldingly mounted supporting member therefor, a carrying member for said jaw and its yielding support, and means co-axial with said jaw to cause the latter to grasp the nut unyieldingly for the nut cracking operation.

13. Nut cracking mechanism comprising in combination a nut cracking jaw, a spring pressed sleeve therefor, a shaft supporting said jaw and sleeve and having an abutment, and a device mounted upon said sleeve and co-acting with the jaw and abutment to cause the jaw to grasp the nut unyieldingly for the nut cracking operation.

14. Nut cracking mechanism including a nut cracking jaw or element having a spring pressed sleeve, a shaft carrying said sleeve and jaw, and means directly mounted upon said sleeve and rotatable thereon to cause the jaw to grasp the nut unyieldingly for the nut cracking operation.

15. Nut cracking mechanism including a nut cracking jaw having a spring pressed sleeve, a shaft wherein said sleeve is mounted, and a wedge or cam member carried by said shaft in the rear of the jaw to cause the latter to grasp the nut unyieldingly.

16. Nut cracking mechanism having a jaw provided with a spring pressed sleeve, a shaft wherein said sleeve is socketed, and a cam rotatable about the axis of said shaft to co-act with said jaw and thereby to cause the latter to grasp the nut unyieldingly.

17. Nut cracking mechanism having a jaw provided with a spring pressed sleeve, an ejector within said sleeve, a supporting shaft for said jaw, sleeve and ejector, and a cam mounted upon said sleeve and co-acting with said jaw to cause the latter to grasp the nut unyieldingly.

18. Nut cracking mechanism comprising in combination nut cracking jaws or elements, means yieldingly to support the same for the reception of the nuts, wedging means to cause said jaws rigidly to bind upon the nut, and means relatively to project the jaws to crack the nut.

19. Nut cracking mechanism comprising in combination nut cracking jaws or elements, means yieldingly to support the same for the reception of the nut, sets of rotatable cam members—in proximity to and acting upon said jaws to cause them unyieldingly to grasp the nut, and means relatively to project said jaws to crack the nut.

20. Nut cracking mechanism comprising in combination, nut cracking jaws or elements, means yieldingly to support the same for the reception of the nut, sets of cam members co-acting with said jaws to cause them to bind unyieldingly upon the nut, means to rotate said cam members in opposite directions, and means to project said jaws to crack the nut.

21. Nut cracking mechanism comprising in combination nut cracking jaws, threaded shafts supporting the same, internally threaded pinions mounted upon the threaded portions of said shafts and means to rotate said pinions in opposite directions, thereby to project and retract said cracking jaws.

22. Nut cracking mechanism comprising in combination nut cracking jaws, threaded shafts supporting the same, internally threaded pinions mounted upon the threaded portions of said shafts, means to rotate said pinions in opposite directions, thereby to project and retract said cracking jaws, and ejectors within said jaws.

23. Nut cracking mechanism comprising in combination a pair of axially alined shafts, means to reciprocate the same toward and from each other, nut cracking jaws sleeved within said shafts and supported for yielding axial movement therein, and means supported by said shafts to wedge the jaws unyieldingly against the nuts prior to the nut cracking movement of said shafts.

24. Nut cracking mechanism comprising in combination nut positioning means including a pair of relatively movable jaws, a movable member supporting said jaws, a pair of nut cracking jaws, means to move said member to position the nut between said cracking jaws, and means to impart nut cracking movement to said jaws.

25. Nut cracking mechanism having nut positioning means including a head or block, means to reciprocate the same, a pair of relatively movable jaws carried by said head or block, means to position the nut between said jaws, and nut locking jaws between which the nut is positioned by said positioning jaws.

26. Nut cracking mechanism comprising a head or block having a fixed jaw, a movable jaw carried by said head or block, means to reciprocate the latter, means to position a nut between said jaws and nut locking instrumentalities to which the nut is delivered by said head or block.

27. Nut cracking mechanism comprising in combination nut positioning jaws, a plunger to position nuts successively therebetween, nut cracking jaws, means bodily to move the positioning jaws to place the nuts between the nut cracking jaws, and means to impart cracking movement to the latter.

28. Nut cracking mechanism having a nut conveyer composed of a sprocket chain having laterally projecting lugs between which the nuts are received, means to drive said chain, and co-acting nut cracking instrumentalities.

29. Nut cracking mechanism comprising in combination a conveyer sprocket chain the links whereof have laterally projecting portions, means to drive said chain, and co-acting nut cracking jaws.

30. Nut cracking mechanism having a shaft, means to reciprocate the same, a nut cracking jaw sleeved within said shaft, an ejector axially positioned within said jaw, means yieldingly to support said jaw, and co-acting means to hold the jaw rigidly against the nut.

31. Nut cracking mechanism having a threaded shaft, an internally threaded pinion to reciprocate the same, a nut cracking jaw received within a recessed portion of said shaft, a spring yieldingly to support said jaw and one or more members rotatable relatively to said shaft to hold the jaw rigidly against the nut prior to the nut cracking operation.

32. Nut cracking mechanism comprising in combination, a block having a nut receiving jaw, means to reciprocate said block, a co-acting, movable jaw, a plunger to position the nut between said jaws, nut cracking jaws, means to move the first mentioned jaws to position the nut between the cracking jaws, and means to impart cracking movement to the latter.

33. Nut cracking mechanism comprising in combination, a block having a jaw, a co-acting jaw carried by said block, means to position the nut between said jaws, a pair of nut cracking jaws, and means for moving said block 29 to convey the nut to said cracking jaws.

34. Nut cracking mechanism comprising in combination, a block having a fixed jaw, a movable jaw pivoted to the block, a plunger, means to operate said plunger to position the nut between said jaws, nut cracking jaws, means to reciprocate said block to position the nut between the nut cracking jaws.

In testimony whereof, I have signed my name to this specification, in the presence of two subscribing witnesses.

MATTHEW LOVE.

Witnesses:
HENRY R. SWIFT,
F. C. MORELAND.